Feb. 10, 1970     S. M. DOWNS ET AL     3,494,093
CONTAINER CLOSURE AND METHOD OF FILLING CONTAINERS
Filed June 23, 1967     2 Sheets-Sheet 1
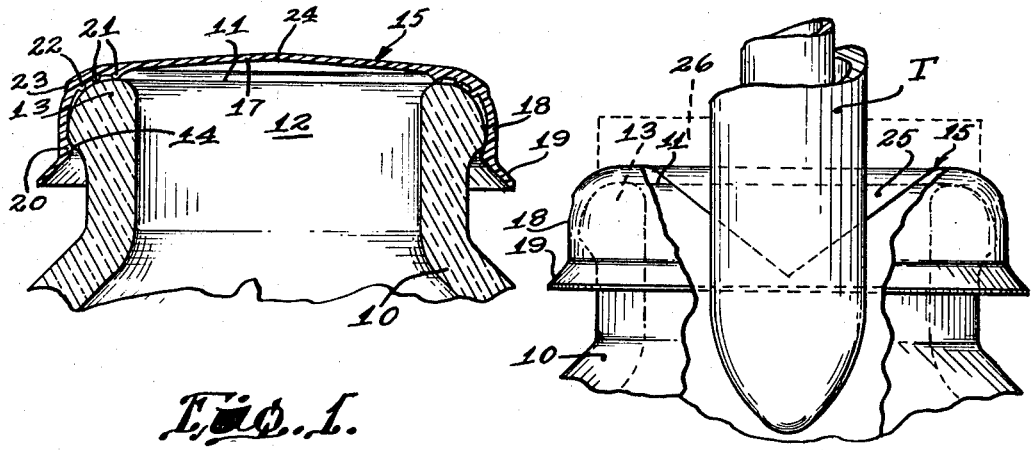
Fig. 1.
Fig. 2.
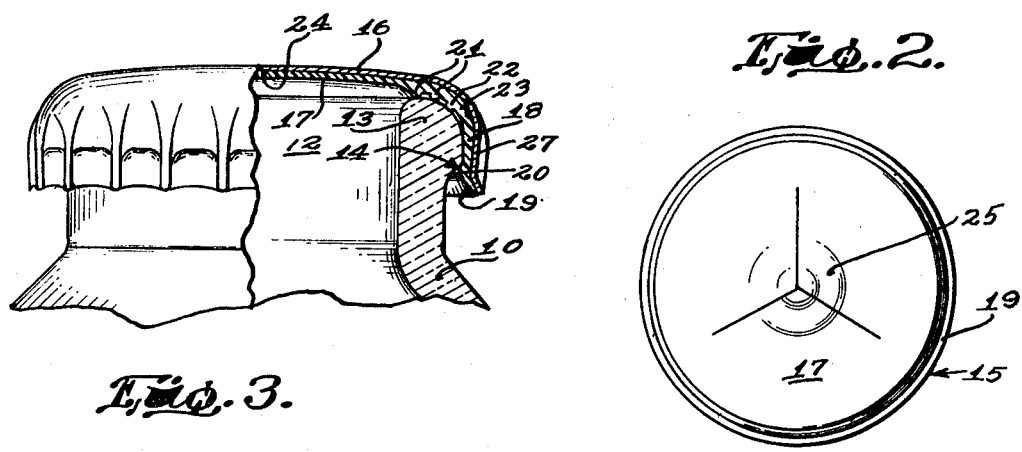
Fig. 3.
Fig. 4.
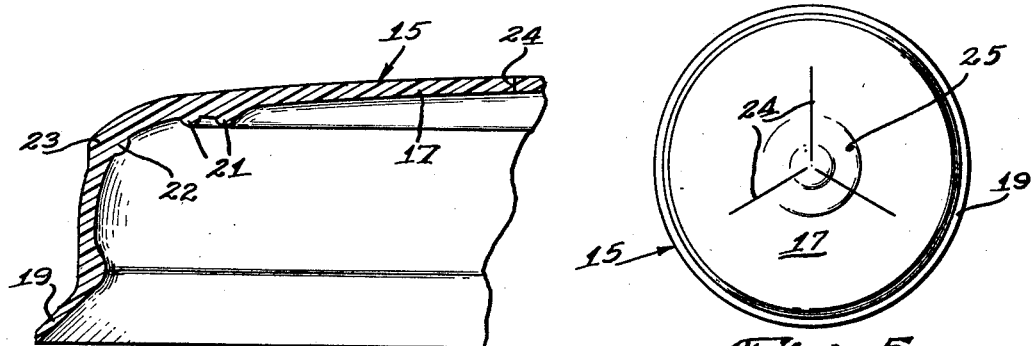
Fig. 6.
Fig. 5.
INVENTORS
S. M. DOWNS
J. M. WHEATON
BY J. R. Nelson and
W. A. Schaich
ATTORNEYS

United States Patent Office 3,494,093
Patented Feb. 10, 1970

3,494,093
CONTAINER CLOSURE AND METHOD OF FILLING CONTAINERS
Samuel M. Downs, Greenwich, Conn., and Jack M. Wheaton, Toledo, Ohio, assignors to Owens-Illinois, Inc., a corporation of Ohio
Continuation-in-part of application Ser. No. 476,276, Aug. 2, 1965. This application June 23, 1967, Ser. No. 653,296
Int. Cl. B67b 3/02; B67c 7/00; B65b 3/17
U.S. Cl. 53—27                                    9 Claims

ABSTRACT OF THE DISCLOSURE

The invention relates to a method of closing and sealing containers, and to the closure per se. In the manufacture of glass containers, a plastic cover cap liner is applied (snapped on) over the glass finish to close the container against infiltration of foreign particles. The cover cap liner has its top panel portion prescored as by a plurality of radial slits so that at filling the container, a filler tube punctures the top panel and fills the container. Subsequently, the filler tube is withdrawn and a metal cover cap is telescopically applied over the plastic cap liner and deformed to sealingly attach the cap liner and cover cap to the container finish. The closure comprises the two pieces of the plastic snap-on cap liner with radial plural slits in the top wall and a rigid (metal) outer closure cap enclosing the cap liner, the latter having means for releasably sealingly securing the closure cap and cap liner to the glass container finish.

---

This application is a continuation-in-part of application Ser. No. 476,276, filed Aug. 2, 1965, now abandoned.

Our invention relates to container closures and methods of filling containers and more particularly is concerned with the provision of novel, inexpensive means for maintaining initial substantial commercial sterility of newly fabricated containers, such as bottles and the like glass containers and protecting them from contamination resulting from entry thereinto of dust, carton fiber and such foreign matter during transportation and general handling and washing between the container manufacturing plant and the bottler's or customer's filling line. Without such protection, it would be imperative that the containers be thoroughly washed prior to filling. Washing apparatus is both expensive initially to purchase and install, occupies a great deal of floor space and finally the maintenance and operating costs are very substantial.

Heretofore efforts to attain the advantages of our invention have very largely been most unsatisfactory, if not complete failures in that, for example, the final closure caps which were to be used ultimately in hermetically sealing the bottles were initially applied to the containers at the annealing lehr to function first as dust caps, then removed by the product packaging customers to permit bottle filling, and finally reapplied by them to seal the containers. Mix-up incident to removal and reapplication of the caps (crown caps, for example) was a common and unavoidable experience. Also the expense of providing special crown capping apparatus in the container manufacturing plant would be prohibitive. Alternatively, dust-caps have been applied at the glass manufacturer's annealing lehr and later discarded completely by the bottlers or packers, or in some instances returned to the glass manufacturer for washing and re-use. These procedures were most unsatisfactory because of high cost and obvious general inconvenience.

An important object of our invention, therefore, is the provision of simple, easily usable means for accomplishing in practical fashion the desired but heretofore unattained basic results of the above procedure, without any added cost over that common in a given commercial operation, as practiced today.

It is also an object of our invention to provide a dust-cap, which, once having been applied to a bottle or other container, while new and sterile, remains in place upon the container until removed together with a final closure cap by the ultimate consumer of the packaged product.

A further object of our invention is the provision of a dust-cap which is snapped over the container neck to effectively close the mouth opening, at the glass manufacturer's plant, such dust-cap also functioning ultimately and with equal importance as a liner for and, if deemed desirable, secured to the outer or closure cap, thus being capable of removal with and as a part of the latter by the ultimate consumer.

Likewise, it is an object of our invention to provide a thermoplastic dust-cap, as suggested above, wherein the top panel or wall is so formed as to be readily punctured by a conventional filling or air tube, the opening created by the tube closing immediately upon retraction of the tube, due in large part to the elastic memory of the plastic material.

Moreover, it is an object of our invention to provide a dust-cap, as suggested above, wherein preformed generally radial slits, intersecting or otherwise, or perhaps relatively deep scores, either external or internal, in the top wall or panel, create readily displaceable wings or flaps, which move aside with projection of the tube axially through the slitted or scored top wall, and again because of the elastic memory of the plastic material, automatically return to their normal mouth closing position upon withdrawal of the tube.

It is a further object of our invention to provide novel means whereby a closure cap telescoped over the dust-cap following the container filling step, may be bounded to the latter so as to necessarily be removable as an integral part of the complete closure. To this end the dust-cap, or liner, which it eventually becomes, as a practical matter, may be a vinyl material with a vinyl lacquer coating upon its outer surface for contact with the closure cap. Momentary exposure to heat, as is quite obvious, will cause the two elements to bond together.

It is also an object of our invention to provide closure means adaptable for use not only in conjunction with conventional crown-type closure caps, as the outer cap, but also with other conventional closures, such as aluminum tear-off caps, etc.

Elimination of container washing, as is abundantly evident, also makes it possible for the packers to practice "in-case" filling with some products wherein the bottles are both filled and finally closed without their being removed from the shipping cases or cartons in which they were placed at the glass plant. This is a wholly practical operation, as it apparent from the fact that the bottle interior is sterile by reason of its having been sealed at the annealing lehr in the glass plant and as a consequence, only the top of the dust-cap need be cleaned and that may be accomplished easily by jets of air, water or steam.

It furthermore is an object of our invention to provide a dust-cover cap formed of polyethylene or a like thermoplastic material and of such dimensions as to protect the bottle lip or finish against direct contact with the metal outer closure cap, thus functioning as a cushion, reducing glass breakage such as is encountered from time to time during the conventional capping operations.

Finally, it is an object of our invention to provide a thermoplastic dust-cap of the above character in which the skirt is of such height as to extend well over the lip or rim of the container, when functioning as a closure cap liner, and thereby effectively seal checks and surface cracks in all areas of the lip. This is most important in that it seals against possible leakage in areas normally left unprotected by conventional closures.

Other objects will be in part apparent and in part pointed out hereinafter.

In the accompanying drawings, forming a part of our application:

FIG. 1 is a fragmentary sectional view showing our dust-cap snapped in place upon the neck of a conventional beverage bottle;

FIG. 2 is a sectional elevational view generally similar to FIG. 1, but with a conventional filling or air tube projecting through the dust-cap;

FIG. 3 is a view like FIG. 1, but with a cover cap enclosing the dust-cap and secured to the bottle neck in conventional fashion;

FIG. 4 is a plan view of the dust-cap showing one possible arrangement of radial scores or slits in the panel or top wall;

FIG. 5 is a view like FIG. 1, with the inner ends of the slits spaced apart approximately .015 of an inch, thus providing readily puncturable means which precludes accidental premature opening of the dust-cap yet permits ready intentional opening for filling purposes;

FIG. 6 is an enlarged sectional view showing the slit formation in the top wall of the dust-cap;

Figure 8:
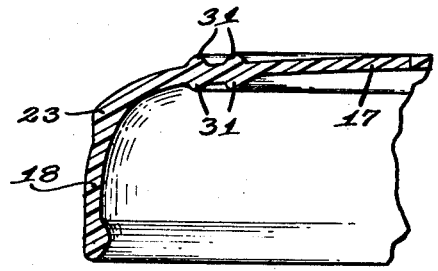
Figure 9:
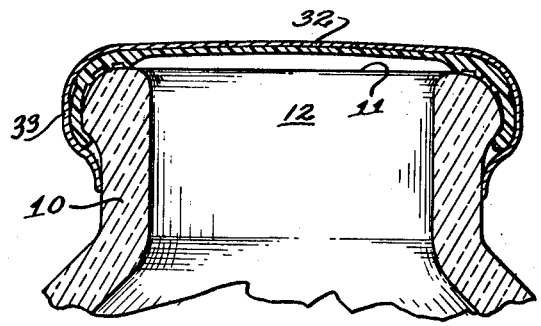

FIG. 8 is a fragmentary sectional view showing a slightly modified form of dust-cap in which that area at the juncture of the top wall and attaching skirt is ribbed in a fashion to aid in sealing and in imparting rigidity to the element, thus facilitating high speed automatic application of the caps at the container manufacturer's plant; and FIG. 9 is a view like FIG. 3, but showing a container provided with a dust-cap and tear-off type of cover cap.

In one of the illustrated embodiments of our invention (FIGS. 1–4 and 6) there is shown a bottle neck 10, terminating at its upper end in an annular rim 11, defining the mouth 12. Obviously we do not intend restricting our invention to use with glass bottles. The rim 11 curves outwardly and downwardly as an external bead 13 creating a wide annular sealing surface and has its extreme lower margin directed more or less abruptly downwardly and inwardly to provide a cap retaining annular shoulder 14 or abutment. This, too, may vary somewhat from the specific contour shown. As explained heretofore, where glass bottles are involved, it is our intention to close them immediately upon their removal from the annealing lehr in the bottle manufacturer's plant. Thus their sterility can and will be maintained until the bottles reach the packer's plant and are placed upon the conventional filling line.

To this end we close the mouth 12 with a dust-cap 15 which, as is apparent, also functions as a liner for the final closure cap 16. This dust-cap is constructed of a material such that it is soft enough to seal on the glass finish at either of the sealing surfaces provided by the annular shoulder 14 or the surface of the rim 11; yet resilient or pliable enough to snap into place and take up any tolerances in the glass finish to retain the dust-cap 15 in place after it is applied. As preferred examples, the dust-cap 15 may be formed of polyethylene, vinyl materials including plasticized polyvinyl chloride, combinations of vinyl chloride-vinyl acetate and like compounds now available, and the butydiene-styrene injection moldable rubbers, or similar elastomeric or thermoplastic materials. This dust-cap 15 comprises a top wall 17 or panel and a depending annular attaching skirt 18 or flange about the periphery of said panel. These two elements may be joined together by a short radius, as shown, or otherwise. The lower margin of the skirt may, if desired, be provided with a flared extension 19. At the juncture of this extension 19 and the skirt 18 is an internal annular bead 20 of sufficient inward radial extent to snap over and securely engage the previously mentioned annular shoulder 14. Thus the dust-cap is firmly and reliably held in position to effectively seal the mouth-opening 12 of the bottle. To further aid in sealing and in imparting rigidity to the dust-cap, there may be one or more small annular concentric beads 21 internally of the panel 17 for contact with the rim of the bottle neck. These beads 21 tend also to compensate for irregularities in the sealing surface of the rim 11. Substantially at the juncture of the dust-cap top wall 17 and its skirt, the wall thickness is increased by opposed annular internal and external ribs 22 and 23, respectively which, with the beads 21, impart desired rigidity to the cap, such being most desirable as an aid in handling of the caps by automatic capping apparatus, because of the very thin, light-weight character of the caps. These dust-caps, as explained heretofore, remain on the bottles until removed with the closure cap by the ultimate consumer. The bottles are filled through the dust-caps by projecting a filling tube through the top wall or panel 17.

To accomplish this, the film-like top wall 17 or panel may be punctured by a filling and/or air tube T of any preferred form. Because of the resilience and inherent elastic memory of the elastomeric material, the puncture tends to be self-closing. Alternatively, the top wall 17 or panel may have a plurality of radial slits 24 which meet at the center of the panel and terminate at their outer ends short of the panel periphery. Thus with insertion of the filling tube T, the flaps or wings 25 between the slits move aside, permitting free entry of the tube into the bottle. Following filling of the bottle, the tube is retracted. A collar or ring 26 encircling the tube T holds the dust-cap against displacement incident to retraction of the tube. Immediately following retraction of the tube T, the closure cap 16, which may, if preferred, be a conventional crown cap, is applied in conventional fashion, such slightly reducing the thickness of the dust-cap skirt 18 and causing the holding bead 20 to more firmly take over the shoulder 14 than when it was functioning merely as a dust-cap. It now has become a liner for the closure cap. It will be observed that the flared extension 19 becomes corrugated and interlocks with the closure cap due to contraction of the closure cap skirt 27. Hermetic sealing, of course, occur along the rim of the neck and because of the exceptional downward extent of the dust-cap skirt 18, we are assured of effective sealing of surface cracks, checks, etc., which often are present in areas somewhat lower than those normally contacted by the conventional cap liners.

In FIG. 5 we show a dust-cap in which the slits 28 are identical to those in FIG. 4, but do not quite meet at the cap center. Thus a small connector 29 or island remains to securely hold the flaps or wings against accidental or premature displacement. This connector, of course, breaks quite readily under pressure of the tube T.

Figure 7:
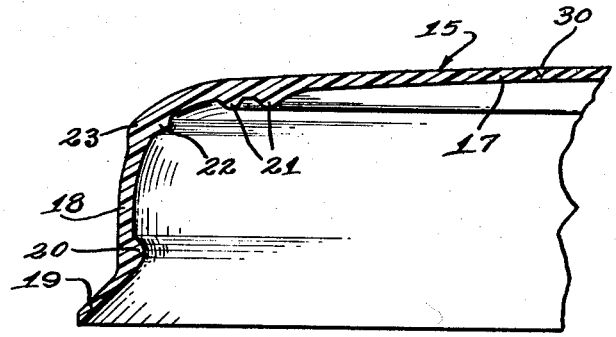
FIG. 7 is a fragmentary sectional view showing deep scores which may replace the slits and be placed either internally or externally of the top wall.

In FIG. 7 we have substituted deep scores 30 for the slits, thus insuring beyond any question against any possible entry of foreign matter into the bottle. Such scores may be either internal or external.

In FIG. 8 the flared extension 19 has been omitted and both internal and external beads 31 are formed near the periphery of the top wall 17 or panel. Thus both rigidity and sealability are enhanced, as is believed self-evident.

In FIG. 9, we have shown our dust-cap without the flared extension 19 and enclosed in a conventional aluminum tear-off type of closure cap 32, the attaching skirt 33 of which is contracted snugly against the neck 10 to thereby effectively sealingly press the dust-cap or liner skirt against the container. As suggested heretofore, our invention is well adapted for use with containers other than glass bottles and, of course, is not limited to used in packaging beverages only, as is believed to be quite obvious.

Modifications may be resorted to within the spirit and scope of the appended claims.

We claim:
1. The method which consists in initially sealing the mouth-opening of a newly fabricated sterile container with an elastomeric combined dust-cap and closure cap liner having a film-like top wall, forming a substantially self-closing filling opening in the top wall preparatory to filling the container, introducing a product through the opening into the container, telescoping a rigid closure cover cap over the dust-cap and mouth-defining portions of the container, and securing the closure cap, container and dust-cap together to hermetically close the container mouth-opening.

2. The method defined in claim 1, and securing the closure cap and dust-cap together so that they are removable as a unit from the container.

3. The method defined in claim 1, and adhesively bonding the closure cap and dust-cap together so that they are removable as a unit from the container.

4. The method which consists in sealing the mouth-opening of a newly fabricated sterile container with a plastic combined dust-cap and closure cap liner having a film-like top wall, projecting a filling or air tube axially through the top wall to form a filling aperture opening into the bottle, filling the bottle through the tube, withdrawing the tube, telescoping a skirted closure cap over the dust-cap and portions of the bottle adjacent the latter, releasably securing the closure cap to the bottle thereby to effect hermetic sealing contact between peripheral areas of the dust-cap, closure cap and container, and securing the caps together so that they will be removable as a unit from the bottle.

5. The method which consists in closing the mouth-opening of a newly fabricated sterile bottle with a resilient thermoplastic combined dust-cap and closure cap liner having a film-like top wall, projecting a filling or air tube axially through the top wall into the bottle, thereby creating a filling opening in the wall which, due to the inherent resilience and elastic memory of the plastic at least in part closes itself upon retraction of the tube, introducing a product through the tube to fill the bottle and then retracting the tube, hermetically sealing the bottle by telescoping a relatively rigid skirted closure cap over the dust-cap and contiguous portions of the bottle, releasably attaching the closure cap to the bottle, and securing the closure cap and dust-cap together so that they are removable together as a unit from the bottle.

6. The method defined in claim 5, the securing together of the closure cap and dust-cap being effected by a heat-activated adhesive carried by one of the caps.

7. The method which consists in forming a skirted dust-cap from a material possessing sealing properties when applied on a container and properties of resilience for retaining said dust-cap in place on the container, affixing the cap to and thereby closing the mouth of a newly formed sterile container at the container manufacturer's plant, inserting a filling or air tube through the dust-cap into the container, filling the container through the tube, retracting the tube, enclosing the dust-cap and adjacent portions of the container with a closure cap, and securing the latter to the container to thereby create an hermetic seal.

8. The method defined in claim 7, the dust-cap being formed from a thermoplastic material and securing said dust-cap and closure cap together.

9. The method defined in claim 7, and heat-bonding the dust-cap and closure cap together.

References Cited

UNITED STATES PATENTS

| | | | |
|---|---|---|---|
| 859,121 | 7/1907 | Schmidt | 53—27 X |
| 901,651 | 10/1908 | Schmidt | 53—27 X |
| 3,255,926 | 6/1966 | Modderno | 53—36 X |
| 3,420,033 | 1/1969 | Modderno | 53—36 |
| 3,446,380 | 5/1969 | Everett | 53—27 X |
| 3,340,671 | 9/1967 | Loo | 53—37 |
| 774,378 | 11/1904 | Carter | 53—281 |
| 1,889,629 | 11/1932 | Bohmer | 53—37 X |
| 2,108,114 | 2/1938 | Foard | 53—15 |
| 2,634,013 | 4/1953 | Atwood | 53—296 X |
| 2,783,597 | 3/1957 | Hohl | 53—16 |
| 2,937,481 | 5/1960 | Palmer | 53—17 X |
| 3,325,033 | 6/1967 | Wheaton | 53—37 X |
| 3,345,798 | 10/1967 | Sternau | 53—296 X |

WAYNE A. MORSE, Jr., Primary Examiner

U.S. Cl. X.R.

53—37, 141, 268, 281, 296